United States Patent [19]

Domaas

[11] 3,861,229

[45] Jan. 21, 1975

[54] CENTRIFUGAL CLUTCH

[75] Inventor: Perry M. Domaas, Minneapolis, Minn.

[73] Assignee: Textron Inc., Providence, R.I.

[22] Filed: Oct. 24, 1973

[21] Appl. No.: 409,138

Related U.S. Application Data

[63] Continuation of Ser. No. 301,210, Oct. 26, 1972, abandoned, which is a continuation of Ser. No. 82,633, Oct. 21, 1970.

[52] U.S. Cl. ........................................ 74/230.17 E
[51] Int. Cl. ........................................... F16h 55/22
[58] Field of Search ............................ 74/230.17 E

[56] References Cited
UNITED STATES PATENTS

| | | | |
|---|---|---|---|
| 3,066,546 | 12/1962 | Thostenson | 74/230.17 E |
| 3,230,787 | 1/1966 | Siegal | 74/230.17 E |
| 3,266,330 | 8/1966 | Galleher | 74/230.17 E |
| 3,280,648 | 10/1966 | Nelson | 74/230.17 E |
| 3,574,366 | 4/1971 | Thostenson | 74/230.17 E |
| 3,597,987 | 8/1971 | Kiekhafer | 74/230.17 E |
| 3,605,510 | 9/1971 | Laughin | 74/230.17 E |
| 3,605,511 | 9/1971 | Deschene | 74/230.17 E |
| 3,608,387 | 9/1971 | Fox | 74/230.17 E |

*Primary Examiner*—Leonard H. Gerin
*Attorney, Agent, or Firm*—Merchant, Gould, Smith & Edell

[57] ABSTRACT

The disclosure is directed to a variable ratio centrifugal clutch having driving and driven assemblies connected by an endless belt. The driving assembly consists of a pair of sheaves affixed to a drive shaft, one being axially stationary and the other being axially movable with respect thereto. The movable sheave forms part of an enclosed housing in which a plurality of flyweights are pivotally mounted. The flyweights operate in conjunction with a stationary member which is also disposed inside the enclosure. Guide members formed integrally with the rotatable enclosure operate in conjunction with guiding portions of the axially stationary member to insure proper relative axial movement therebetween. In response to increases in drive shaft speed, the flyweights swing outward and engage the stationary member to move the housing in its entirety along the shaft to bring the sheaves together.

17 Claims, 6 Drawing Figures

PATENTED JAN 21 1975
3,861,229
SHEET 1 OF 2
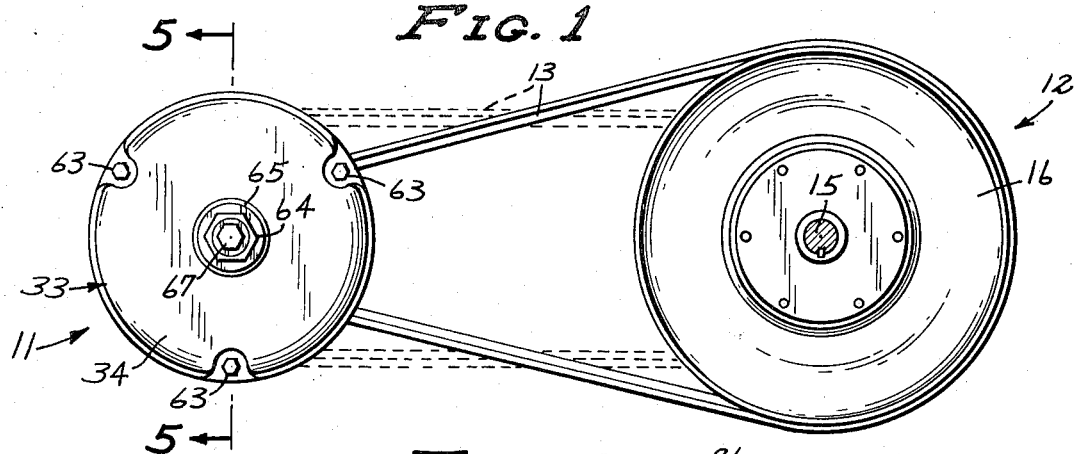
FIG. 1
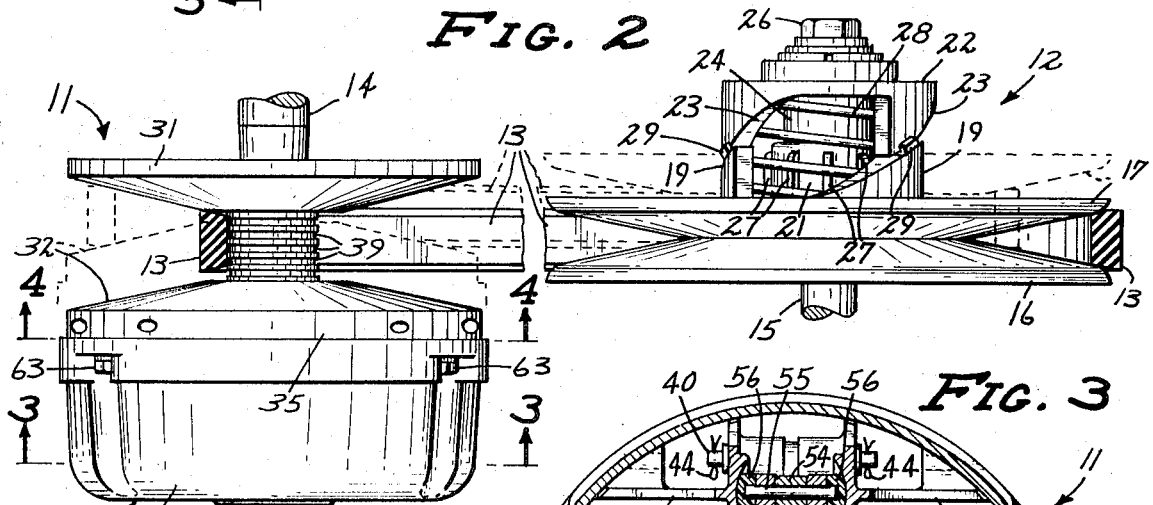
FIG. 2
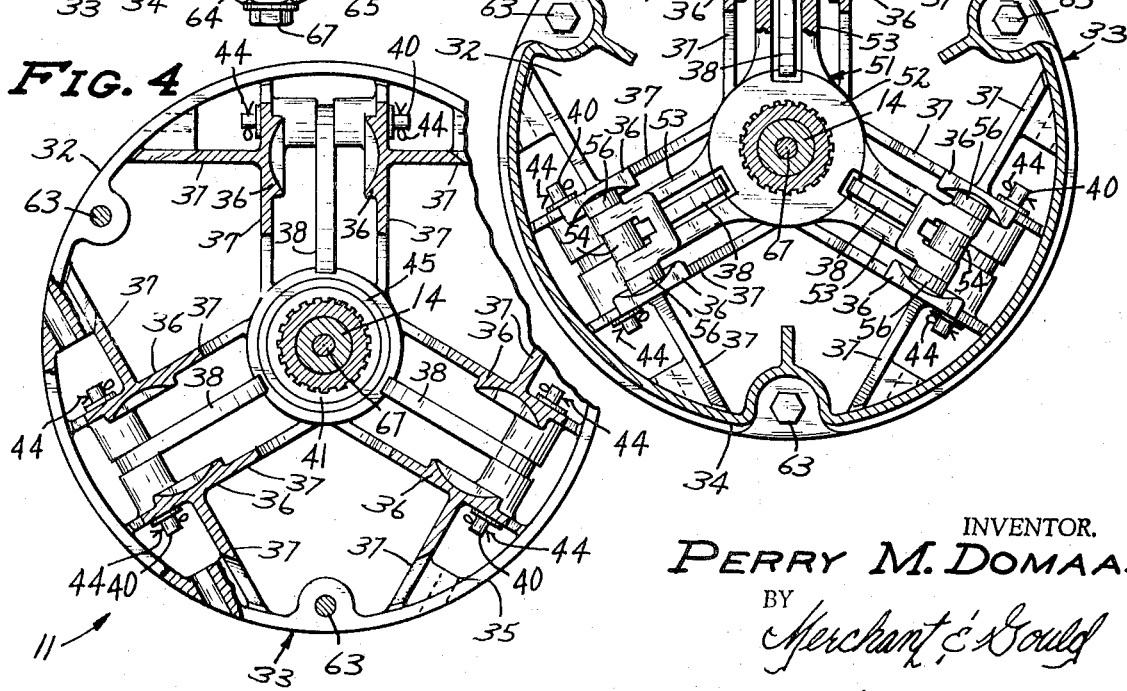
FIG. 3
FIG. 4
INVENTOR.
PERRY M. DOMAAS
BY
Merchant & Gould
ATTORNEYS

INVENTOR.
PERRY M. DOMAAS 3,861,229

CENTRIFUGAL CLUTCH

This is a continuation of application Ser. No. 301,210, filed Oct. 26, 1972 now abandoned, which was a Continuation of prior application Ser. No. 82,633, filed on Oct. 21, 1970.

The invention falls within the art of centrifugal clutches generally, and is specifically directed to centrifugal clutches consisting of driving and driven assemblies that vary the ratio of input shaft rotation to output shaft rotation.

Centrifugal clutches of this specific type find particular application in conjunction with smaller internal combustion engines where the use of gear transmissions is impractical or too costly. By providing a variable ratio or input to output rotational speed, the clutch serves as both clutch and transmission.

The driving assembly of a variable ratio centrifugal clutch ordinarily consists of a pair of sheaves mounted for rotation on a drive shaft, one of the sheaves being axially stationary on the shaft and the other being axially movable to effect the clutching operation. The position of the movable sheave is governed by a plurality of flyweights that rotate with the shaft and are mounted to swing radially outward in response to increases in shaft speed. The flyweights include cam surfaces, and through engagement with cooperating cam follower surfaces the sheave is moved axially along the shaft.

Since proper operation of the clutch is dependent on movement of the flyweights, it is imperative that all of the moving parts, including flyweights, pivotal connections, cam and cam following surfaces, be kept clean and protected from direct, mud and other potentially damaging substances.

One successful solution to this problem forms the subject matter of a patent application filed on Oct. 24, 1969 in the name of Eugene W. Laughlin, Ser. No. 869,165 now U.S. Pat. No. 3,605,510, and entitled "Centrifugal Clutch." That application discloses a centrifugal clutch comprising an axially stationary sheave mounted on a rotatable shaft, a flyweight-carrying member which also rotates with the shaft and is axially stationary thereon, and an enclosure which forms the second sheave. The enclosure fully encloses the flyweight carrying member and is axially movable with respect thereto.

This invention is an improvement on the aforesaid patent application, and specifically contemplates the provision of structure for effecting proper axial movement of the enclosure with respect to the axially stationary member. The improvement comprises guiding means formed on the inner surface of the enclosure and which project in cantilever fashion for receiving engagement with guide portions on the enclosed axially stationary member. This structure not only permits improved relative axial movement, but also lends itself to placement of the flyweights and the surfaces which they engage in the respective guiding areas. This eliminates the need for completely separate structure for flyweight and guiding operation, which in turn simplifies the overall structure and its method of assembly.

Another advantage arises from the enclosure structure, which preferably consists of a sheave and a bell housing which are sealably merged. With the guiding members projecting in cantilever fashion from the inner face of the sheave, no components other than the sheave itself are formed with or connected to the bell housing. Consequently, assembly of the clutch is further simplified and full access to the inside of the clutch for purposes of maintenance and repair is provided.

An advantage which is not evident from mere observation of the clutch is its ability to operate more smoothly than existing clutches through the entire operating range of shaft rpm's. One reason for this appears to result from the ability to establish dynamic balance of the overall assembly during its manufacture. This is made possible through integral formation of the guiding means on the inner surface of the sheave and automatic alignment of the components during assembly. Another reason appears to reside in the confinement of component movement to specific areas within the enclosures; viz., the areas of guided axial movement. The resultant smooth operation is not only more desirable from the standpoint of vehicle operation, but also decreases component wear significantly, thereby decreasing the chance of clutch failure and increasing the period of service free operation.

BRIEF DESCRIPTION OF THE DRAWINGS

FIG. 1 is an elevational view of a variable ratio centrifugal clutch consisting of a driving portion and driven portion;

FIG. 2 is an enlarged top elevational view of the variable ratio centrifugal clutch shown in FIG. 1, portions thereof broken away;

FIG. 3 is an enlarged cross sectional view of the centrifugal clutch driving portion taken along the line 3—3 of FIG. 2, a portion thereof being viewed in further section;

FIG. 4 is an enlarged cross sectional view of the centrifugal clutch driving portion taken along the line 4—4 of FIG. 2, a portion thereof being taken in further sections;

DESCRIPTION OF THE PREFERRED EMBODIMENT

Figure 5:
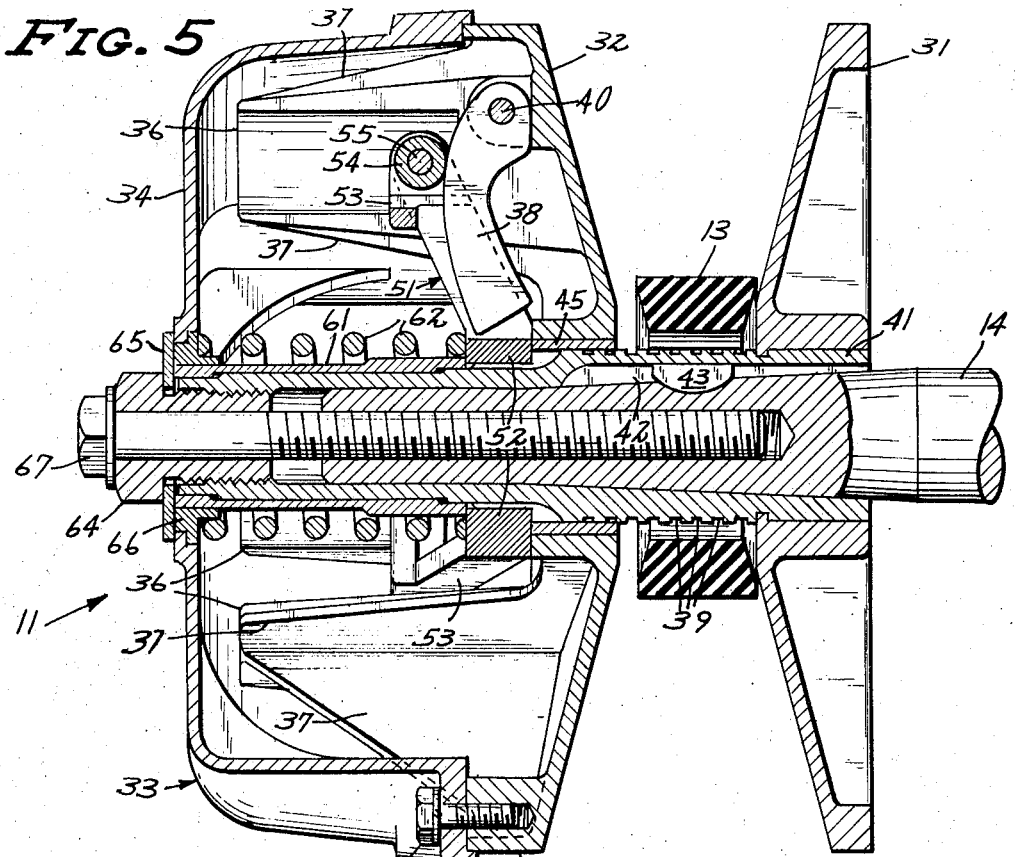
FIG. 5 is an enlarged sectional view of the clutch driving portion in one operating position, taken along line 5—5 of FIG. 1.

In FIG. 1, a variable ratio centrifugal clutch is shown, consisting of a driving assembly 11 and a driven assembly 12 interconnected by an endless belt 13. Referring initially to FIG. 2, driving assembly 11 is shown to be mounted on an output drive shaft 14 of a power plant (not shown), while driven assembly 12 is mounted on an output shaft 15 adapted for connection with a utilization device (not shown). Driven assembly 12 consists of a stationary sheave 16 and a sheave 17 that is axially movable on shaft 15 as discussed below.

Forming part of sheave 17 are three ramp sections 19 (only two of which can be seen in FIG. 2) and a hub 21. A ramp member 22 includes three ramp surfaces 23 corresponding to ramp sections 19, and a central portion 24 which is suitably secured to shaft 15 as by a slot and key or splining. A spring 28 is disposed in compression between sheave 17 and member 22, and the entire assembly is held in place by a bolt 26 which threads into shaft 15. Hub 21 has a plurality of spacers 27 which keep spring 28 in proper alignment.

As assembled, sheave 17 is normally urged toward stationary sheave 16 by spring 28, but by application of a proper force spring 28 can be overcome so that sheave 17 moves both rotationally and axially by virtue of ramp sections 19 engaging ramp surfaces 23. In order to prevent excess wear therebetween, ramp surfaces 23 are provided with pads 29 which also provide a desired frictional relationship between the two.

Driving assembly 11 also has a stationary sheave 31 fixed on shaft 14 and a movable sheave 32 (see also FIG. 4) that forms part of a movable enclosure 33. Enclosure 33 is normally urged away from sheave 31, but in response to increasing angular velocity of shaft 14 moves axially as shown by the dotted lines of FIG. 2. Belt 13 normally occupies a slack position against shaft 14 when driving assembly 11 revolves slowly, but as enclosure 33 progresses axially it is forced radially outward, also as represented by dotted lines.

With the movement of belt 13 radially outward on driving assembly 11, movable sheave 17 of driven assembly 12 also begins to move away from sheave 16 against the bias of spring 28. However, before this can occur the coefficient of static friction existing between pads 29 and ramps sections 19 must be overcome. Rotation of both assemblies 11 and 12 is in the counterclockwise direction as seen in FIG. 1, so that when the static friction of pads 29 and the biasing force of spring 28 are overcome sheave 17 moves clockwise against belt movement, and the gripping force between belt 13 and sheaves 16 and 17 therefore remains great. Thus, for increasing angular velocity of shaft 14, enclosure 33 approaches stationary sheave 31 to move belt 13 radially outward from its slack position, which in turn causes belt 13 to move radially inward with respect to driving assembly 12, resulting in rotation of output shaft 15.

Since the radial position of belt 13 with respect to sheaves 31 and 32 of driving assembly 11 and sheaves 16, 17 of driven assembly 12 varies as a function of the angular velocity of shaft 14, it follows that the ratio of revolutions of the shaft 14 to revolutions of the shaft 15 also varies as a function of shaft 14 speed. As low rpm's, this ratio is infinite since shaft 14 revolves and belt 13, in its slack position, is unable to transmit rotational energy to driven assembly 12 and output shaft 15 cannot revolve. With increasing rpm's by shaft 14, this ratio is decreased since the radial distance of belt 13 from shaft 14 is increasing while its radial distance from shaft 15 is decreasing. By virtue of this variable ratio feature, the centrifugal clutch performs the function of both clutch and transmission.

Figure 6:
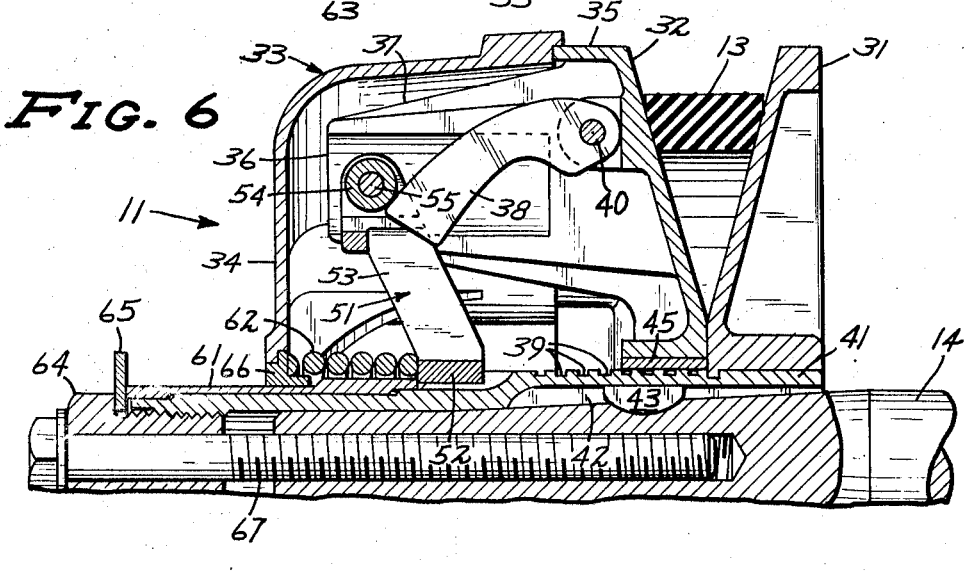
FIG. 6 is the enlarged view of FIG. 5 taken in another operating position, portions thereof being broken away.

FIGS. 3-6 show driving assembly 11 in detail. FIGS. 5 and 6 show fixed sheave 31 to be affixed to one end of a tubular shaft 41 which is slidably carried by movable housing 33, as will be described in further detail below. Shaft 14 has a tapered end which is received by tubular shaft 41 and is rotationally affixed thereto by means of a key 43 which is disposed in a keyway 42. In this area engaged by belt 13, tubular shaft 41 has an increased diameter and includes a plurality of annular grooves 39 which assist in keeping shaft 41 free of mud, snow, ice, burned rubber, etc.

As mentioned above, movable sheave 32 constitutes one part of movable housing 33, the other component consisting of a bell shaped housing 34. The external shape of sheave 32 is defined by the conical clutching surface and a peripheral edge 35 (FIG. 5). Integrally formed on the inner or unexposed face of movable sheave 32 are six guiding members 36 which are disposed in opposed pairs. Members 36 project in cantilever fashion away from the clutching surface of movable sheave 32, and each is given support by a triangular strengthening web 37. As best shown in FIG. 4, the opposed faces of each pair of guiding members 36 form arcuately shaped bearing surfaces over the major portion of their projected length, for a purpose which will become evident below.

Pivotally mounted between each pair of guiding members 36 is a flyweight 38, each of which has an arcuate cam face. This pivotal mounting is accomplished by means of a pivot pin 40, which extends through a bore formed in a thickened portion joining the bases of guiding members 36 and through an opening formed in the flyweight 38 itself. Pivot pin 40 is held in place by a pair of cotter pins 44. Sheave 32 has a centered opening lined with a bearing 45, which permits it to slidably move over the enlarged portion of shaft 41.

An axially stationary member 51 consisting of a hub 52 and three radially extending arms 53 is splined on shaft 41 for rotation therewith. As best shown in FIG. 3, each of the arms 53 is bifurcated and carries a roller and guide assembly at the outer end thereof. This assembly comprises a roller 54, which is disposed between the bifurcations of each arm 53 and is rotatably held in place by a pin 55 which extends through roller 54 and aligned openings formed in the bifurcations. Each of the rollers 54 is positioned for cam following engagement by an associated flyweight 38.

As shown in that portion of FIG. 3 in which one of the arms 53 is shown in partial section, pin 55 projects outwardly of each of the bifurcated portions. A low friction, dome-shaped nylon cap 56 is inserted over each of these projecting pin ends for engagement with the adjacent arcuate bearing surface of an associated guiding member 36. The distance between the outer faces of cap 56 is slightly less than the distance between opposed arcuate bearing surfaces in order that sheave 32 may easily move on shaft 41 in the desired guided manner.

Member 51 is kept in an axially fixed position on shaft 41 by a tubular sleeve 61, which abuts the member and forces it against the enlarged portion of shaft 41. A spring 62 is then inserted over sleeve 61 until it abuts member 51, and bell housing 34 completes the assembly of enclosure 33. Housing 34 has an inwardly forming diameter conforming to the peripheral flange 35 of sheave 32, and it is sealably fastened thereto by means of circumferentially spaced bolts 63 and a tubular center bolt 64 and washer 65. Spring 62 is placed in compression through its engagement with member 51 and collar bearing 66, so that sheave 32 is normally biased away from sheave 31.

The entire clutch assembly is affixed to shaft 14 by means of a bolt 67, which projects through centerbolt 64 and screws into a threaded portion of shaft 14.

In operation, driving assembly 11 is in the position shown in FIG. 5 when shaft 14 is at rest. There is no force to oppose the biasing force of spring 62, and with sheave 32 in its farthest position from sheave 31 flyweights 38 assume the position shown in FIG. 5. As shaft 14 begins to rotate and increases in angular velocity, flyweights 38 begin to move radially outward by virtue of the centrifugal force acting through their respective centers of mass. The cam face of each of the flyweights 38 engages its associated roller 54, and, since member 51 is axially fixed on shaft 41, the entire enclosure 33 moves toward stationary sheave 31. With increasing rpm's of shaft 14, sheave 32 engages belt 13, causing it to move radially outward on the conical surfaces of sheaves 31 and 32, and thereby changing the rpm ratio between driving assembly 11 and driven assembly 12 (See FIG. 6).

Although the torsional forces acting between member 51 and sheave 32 are great, the guiding assembly comprising guiding members 36, arms 53 and caps 56 prevents relative rotational movement between sheave 32 and shaft 41 while permitting smooth and accurate relative axial movement therebetween. I have found that caps 56 undergo negligible wear over extended periods of usage while guiding the relative axial movement without binding. The structure also provides an inherent position limit for flyweights 38, which are confined to the maximum outer position shown in FIG. 6 by the axial spacing between member 51 and sheave 32, thereby preventing malfunction arising from excessive flyweight movement.

What is claimed is:

1. A centrifugal clutch comprising:
  a. rotatable shaft means;
  b. first rotatable means mounted on the shaft means and axially stationary thereon, the first rotatable means defining a first clutching surface;
  c. second rotatable means mounted on the shaft means and axially movable thereon, the second rotatable means forming an enclosure and defining a second clutching surface cooperable with the first clutching surface;
  d. third rotatable means mounted in an axially stationary position on the shaft means and within the rotatable enclosure;
  e. one of said second and third rotatable means having a plurality of pairs of spaced members projecting toward the other of said second and third rotatable means, the opposed faces of each pair forming guiding surfaces which extend essentially parallel to the axis of the shaft means;
  f. the other of said second and third rotatable means having a guiding member for each of said pairs, each guiding member constructed and arranged for cooperating, guiding engagement with the opposed guiding surfaces;
  g. and centrifugal actuating means disposed within said rotatable enclosure for effecting axial movement thereof relative to the first rotatable means as a function of rotational velocity of the shaft means.

2. The centrifugal clutch defined by claim 1, wherein the guiding members are disposed on the third rotatable means.

3. The centrifugal clutch defined by claim 2, wherein the third rotatable means comprises a hub and a radially extending arm for each pair of spaced members, the guiding members being carried at the outer ends of the arms.

4. The centrifugal clutch defined by claim 1, wherein the centrifugal actuating means comprises a plurality of flyweights pivotally mounted on one of the second and third rotatable means and arranged to move radially outward with increasing rotational velocity of the shaft means, the flyweights being engageable with the other of said second and third rotatable means to effect said axial movement relative to the first rotational means.

5. The centrifugal clutch defined by claim 4, wherein a flyweight is provided for each pair of spaced members, the flyweight being mounted between the spaced members at the base thereof.

6. The centrifugal clutch defined by claim 5, and further comprising a roller operatively carried by each of the guiding members for engagement by its associated flyweight.

7. The centrifugal clutch defined by claim 4, wherein the flyweights are mounted on the second rotatable means.

8. The centrifugal clutch defined by claim 7, wherein the third rotatable means comprises a hub having a plurality of radially extending arms, each arm carrying a guiding member at its outer end.

9. The centrifugal clutch defined by claim 8, wherein:
  a. a flyweight is provided for each pair of spaced projections, the flyweights being mounted between the projections;
  b. each radially extending arm is bifurcated at its outer end;
  c. a roller is operatively mounted between the bifurcations of each arm for engagement by the associated flyweight;
  d. and the guiding members comprise low friction caps mounted outside the respective bifurcations on opposite sides of the roller.

10. The centrifugal clutch defined by claim 1, wherein the pairs of spaced members are circumferentially and equidistantly spaced.

11. The centrifugal clutch defined by claim 1, wherein the guiding surfaces comprise bearing surfaces, and each guiding member is constructed and arranged for sliding engagement with its associated opposed bearing surfaces.

12. The centrifugal clutch defined by claim 11, wherein the bearing surfaces are concave over the length, and the engaging portions of the guiding members comprise dome-shaped caps formed from low friction material.

13. The centrifugal clutch defined by claim 1, wherein:
  a. the first rotatable means comprises a first sheave member,
  b. and the second rotatable means comprises a second sheave member and a bell housing sealably connected to define said enclosure.

14. The centrifugal clutch defined by claim 13, wherein the pairs of spaced members are integrally formed with the second sheave member.

15. A centrifugal clutch comprising:
  a. rotatable shaft means;
  b. a first sheave mounted on the shaft means for rotation with the shaft means and axially stationary thereon;
  c. second rotatable means comprising an enclosure mounted for rotation on the shaft means and axially movable thereon, the rotatable enclosure defining a second sheave cooperable with the first sheave;
  d. third rotatable means mounted on the shaft means for rotation on the shaft means and axially stationary thereon, the third rotatable means being disposed within the rotatable enclosure;
  e. the rotatable enclosure having a plurality of pairs of spaced members projecting in cantilever fashion toward the third rotatable means, the opposed faces of each pair of spaced members defining guiding surfaces extending essentially parallel to the axis of the shaft means;

f. the third rotatable means having a guiding member for each of said pairs, each guiding member being constructed and arranged for cooperating, guiding engagement with said opposed guiding surfaces;

g. and a plurality of flyweights pivotally mounted on one of the second and third rotatable means and arranged to move radially outward with increasing rotational velocity of the shaft means, the flyweights being engageable with the other of said second and third rotatable means to effect axial movement relative to the first rotatable means.

16. A centrifugal clutch comprising:

a. a rotatable shaft;

b. a first sheave mounted on the shaft for rotation therewith and axially stationary thereon;

c. a second sheave mounted on the shaft for rotation therewith and axially movable thereon for cooperation with the first sheave;

d. a housing member mounted on the shaft for rotation therewith and axially movable thereon, the housing member being sealably connected to the second sheave member to define a rotatable enclosure;

e. a spider member mounted on the shaft for rotation therewith and axially stationary thereon, the spider member being disposed within the rotatable enclosure;

f. the second sheave further comprising a plurality of pairs of spaced members projecting in cantilever fashion toward the spider member, the opposed faces of each pair of spaced members defining guiding surfaces extending essentially parallel to the axis of the shaft;

g. the spider member comprising an essentially radially extending arm for each of said pairs of spaced members, each of said arms including a guiding member constructed and arranged for cooperating, guiding engagement with its associated guiding surfaces;

h. and a flyweight pivotally mounted to the second sheave between each pair of spaced members at essentially the base thereof and arranged to move radially outward with increasing rotational velocity of the shaft, each flyweight being engageable with an associated arm of the spider member to effect axial movement of the rotatable enclosure relative to the first sheave.

17. The centrifugal clutch defined by claim 16, wherein:

a. each arm of the spider member is bifurcated as its outer end;

b. a roller is operatively mounted between the bifurcations of each arm for engagement by the associated flyweight;

c. and the guiding members comprise low friction caps mounted outside the respective bifurcations on opposite sides of the roller.

* * * * *